OR 3,822,929

United States
Heidrich et al.

[11] 3,822,929
[45] July 9, 1974

[54] ELECTRONICALLY TUNABLE OPTICAL FILTER USING ACOUSTIC WAVES

[75] Inventors: Paul F. Heidrich, Mahopac; Lawrence Kuhn, Ossining; Eric G. Lean, Mahopac, all of N.Y.

[73] Assignee: International Business Machines Corporation, Armonk, N.Y.

[22] Filed: May 27, 1971

[21] Appl. No.: 147,486

[52] U.S. Cl. ............................ 350/161, 350/96 WG
[51] Int. Cl. ................................................ G02f 1/16
[58] Field of Search ...................... 350/160, 96 WG

[56] References Cited
UNITED STATES PATENTS

| | | | |
|---|---|---|---|
| 3,614,201 | 10/1971 | Biazzo | 350/161 |
| 3,617,109 | 11/1971 | Tien | 350/160 |
| 3,617,931 | 11/1971 | Pinnow | 350/162 |
| 3,674,335 | 7/1972 | Ashkin et al. | 350/96 WG |
| 3,674,336 | 7/1972 | Kogelnik | 350/96 WG |

OTHER PUBLICATIONS
Kuhn et al., Real-Time Acousto-Optic Surface Wave Data Processor, IBM Tech. Discl. Bul., Vol. 13, No. 1 (June 1970) pp. 105–106.

*Primary Examiner*—William L. Sikes
*Attorney, Agent, or Firm*—John J. Goodwin

[57] ABSTRACT

A tunable optical filter suitable for use in integrated optical circuits including the combination of a substrate having an optical waveguide such as a thin film thereon. Means such as an optical fiber or grating is provided for introducing light waves in a first mode into the waveguide. An acoustic transducer driven by a tunable electronic signal source is used to propagate acoustic waves on the surface of the waveguide. The optical and acoustic waves interact to produce another optical wave having a mode different than the original optical wave when phase matching conditions are satisfied. A mode filter is located in the waveguide to block the original optical wave and pass the second optical wave.

4 Claims, 5 Drawing Figures

FIG. 1
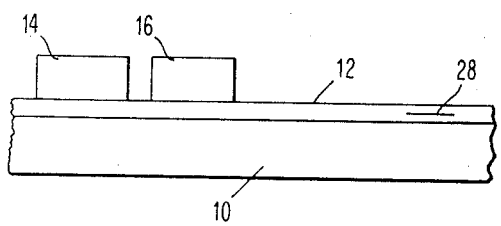
FIG. 2
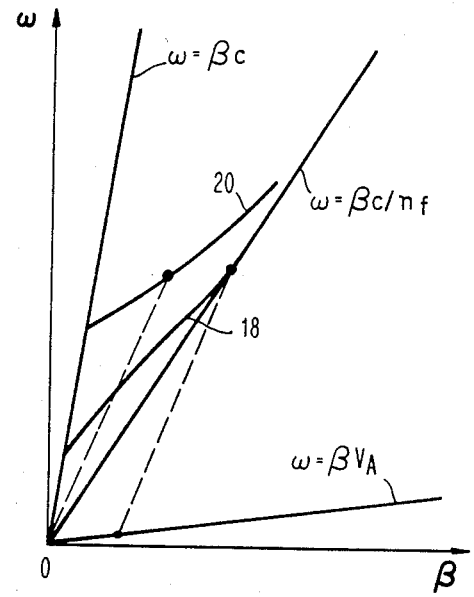
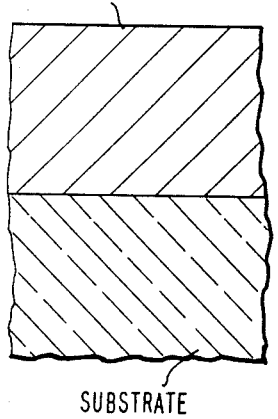
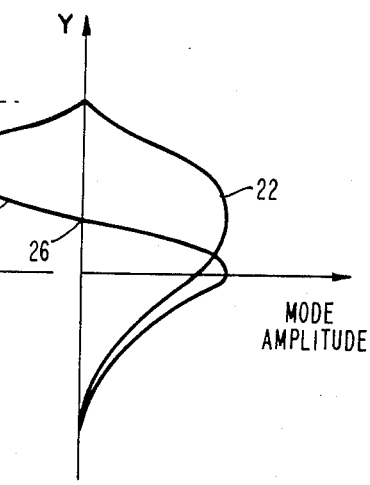
FIG. 3
INVENTORS
PAUL F. HEIDRICH
LAWRENCE KUHN
ERIC G. LEAN
BY John J. Goodwin
ATTORNEY

PATENTED JUL 9 1974

ELECTRONICALLY TUNABLE OPTICAL FILTER USING ACOUSTIC WAVES

BACKGROUND OF THE INVENTION

1. Field of the Invention

The present invention is in the field of acoustic and optical wave propagation devices and more particularly relates to optical filters.

2. Prior Art

An electronically tunable acousto-optic filter for bulk waves is described in the publication "Electronically Tunable Acousto-Optic Filter" by S. E. Harris, S. T. K. Nieh and D. K. Winslow appearing in Applied Physics Letters, Volume 15, Number 10, Nov. 15, 1969, pages 325, 326. In this publication, filtering is achieved by acousto-optically scattering a light beam from ordinary to extraordinary wave in a birefringent crystal. Further, the waves described in the publication are bulk waves in the crystal whereas the present invention uses surfaces acoustic waves and optical waves which are guided in an optical waveguide such as an amorphous film. The publication does not teach the use of surface waves or waveguides and therefore, the operating frequency ranges of the published device are dependent on the birefringence of the crystal material selected. The device of the present invention is not dependent on the type of material. Furthermore, the present invention is amenable to direct integration with other types of planar integrated optical devices, which is not true etc.

SUMMARY OF THE INVENTION

An optical filter based on the principle of mode conversion of an optical wave in a thin film waveguide and subsequent blocking of the undesired mode.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a schematic illustration of a tunable optical filter according to the principles of the present invention.

Referring to FIG. 1 a symbolic block illustration of the basic components of the present invention is shown including a substrate 10 of crystal material such as lithium niobate, quartz or the like. An optical waveguide 12 is disposed on the substrate 10. Waveguide 12 may be a thin film of amorphous material such as glass. Block 14 represents means for introducing light into waveguide 12 for propagating an optical wave in waveguide 12. As will be later described, means 14 may be an optical fiber, optical grating or other suitable means for introducing light into a waveguide.

Figure 5:
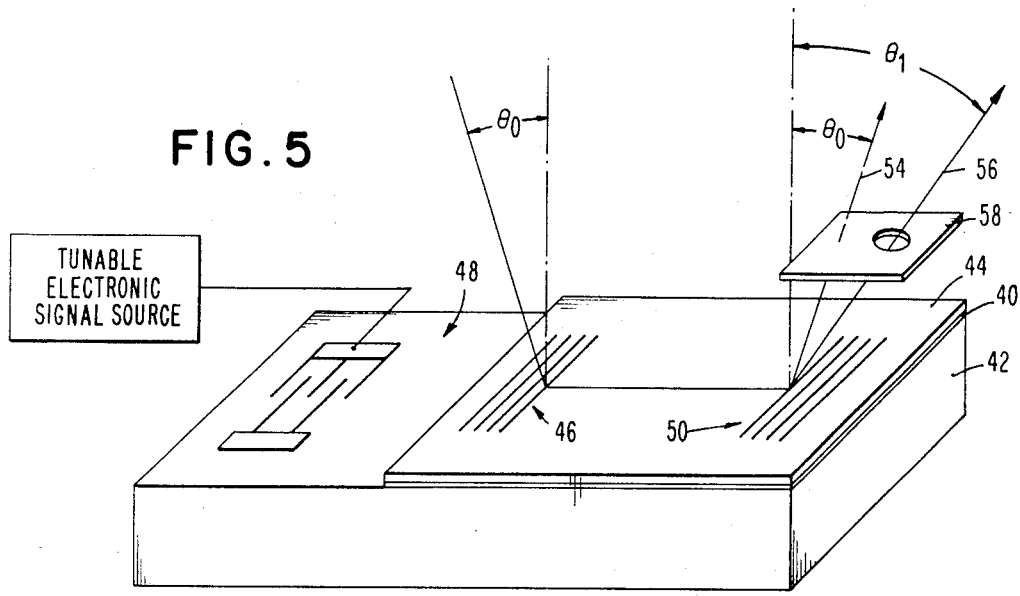

Block 16 represents means for launching an acoustic wave on the surface of waveguide 12. Block 16 may be a wide band interdigital transducer and driven by a tunable electronic signal source and, although shown disposed on waveguide 12, may in some embodiments of the invention be located directly on substrate 10.

As previously mentioned, means 14 introduces a light wave into waveguide 12. The light or optical wave travels in waveguide 12 in a first mode. Referring to FIG. 2 a plot of the relationship of frequency versus wave number is illustrated. Reference number 18 indicates the first waveguide mode of the optical wave. The electronic signal source in block 16 provides a sweep signal to the acoustic transducer which in turn produces an acoustic surface wave on the surface of waveguide 12, which is swept through a range of frequencies.

At one acoustic surface wave frequency phase matching conditions between the optical and acoustic waves are satisfied for only one optical frequency and colinear scattering of energy from the first waveguide mode to the second occurs; the second mode is indicated by reference number 20 in FIG. 2. For example, if the first mode 18 is the $TE_0$ mode, the second mode 20 may be the $TE_1$ mode. For a given acoustic frequency, there is only one optical frequency which will mode convert. That is, there is only one optical frequency which will satisfy phase matching. This occurs naturally in the waveguide because the dispersion curves for the different modes are not parallel as is shown in FIG. 2.

Referring to FIG. 3, the electric field for the first mode (i.e., $TE_0$) is shown by reference number 22 and the electric field for the second mode (i.e., $TE_1$) is shown by reference number 24. The electric field for the first mode 22 has no zero whereas the electric field to the second mode 24 has a zero value at point 26. The two optical waves (the first and second modes) travel in waveguide 12 of FIG. 1 from left to right. A mode filter in the form of a metal plate 28 is located in waveguide 12 in the path of the two optical waves and more particularly in the path of the zero value in the electric field 26 of the second mode. The mode filter 28 blocks or rejects the first optical wave and passes the second optical wave.

The described device has applications in integrated optical systems, for example, serving as a tunable preselector in a coherent optical receiver in a communications system or pollution monitoring system; or acting as a frequency selector in an integrated optical dye laser or parametric amplifier. Another class of applications would involve utilizing it in conjunction with input and output coupler as a tunable filter for application in a non-integrated optical system.

Figure 4:
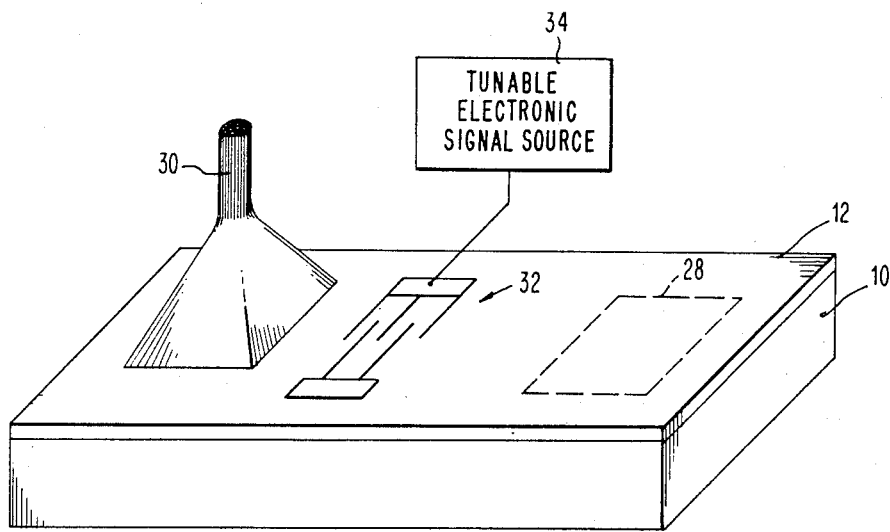

Referring to FIG. 4, a more specific embodiment of the invention is illustrated. Light is conducted from elsewhere in the system via a light pipe 30 which is connected to an optical coupler. This is a conventional way of introducing an optical wave into the waveguide 12. An interdigital acoustic transducer 32 is located on the waveguide 12 and is connected to a tunable electronic signal source 34 which produces a sweep signal through a range of frequencies, thereby propagating a corresponding acoustic wave on the surface of substrate 10, which may be a piezoelectric crystal. As in the structure of FIG. 1, the acoustic and optic waves interact in waveguide 12 of FIG. 4 and when phase matching conditions occur, mode conversion takes place and a second optic wave in a second mode propagates in waveguide 12. The second optic wave passes mode filter 28 and the original optic wave in the first mode is rejected.

Referring to FIG. 5, still another embodiment of the present invention is shown. In this embodiment, the structure differs in that a metal film 40 such as aluminum is disposed between the substrate 42 and the waveguide 44. Also, the optical wave is launched in the waveguide by directing a beam of light at an angle $\theta_0$ onto a first optical grating coupler 46. The metal film 40 functions to isolate the substrate 42 from the waveguide 44 thereby allowing flexibility in selecting the materials for the substrate and the waveguide. Without the provision of the metal film 40, such as in FIG. 5, the index of refraction of the waveguide must be higher than the index of refraction of the substrate. By providing the metal film as in FIG. 5, the index of refraction of the waveguide can be lower than that of the substrate permitting the selection of a substrate having good acoustic properties and a waveguide having good optical properties. Due to the isolation property of the metal layer 10, the acoustic transducer 48 must be disposed on the surface of substrate 42 rather than on the waveguide 44.

As in the previous embodiments, interaction occurs between the acoustic wave and the optical wave and when phase matching conditions are satisfied, mode conversion occurs. Rather than having a metallic type mode filter within the waveguide, the embodiment of FIG. 5 includes a second optical grating coupler 52 which couples out both modes in the form of light beams 54 and 56. The modes can be filtered by the fact that the original mode will produce a light beam at the original angle $\theta_0$ whereas the second mode will produce a light beam at a different angle $\theta_1$. Thus, a light stop 58 is placed such that the second mode light beam 56 is passed and the original mode beam 54 is blocked.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electronically tunable optical filter comprising:

a substrate having a planar surface;
a thin film optical waveguide mounted upon said planar surface of said substrate;
an input light source optically coupled to said waveguide film at a first position for launching a light beam of a first waveguide mode into said waveguide in a preferred direction;
a tunable electronic signal source capable of producing a variable frequency signal at its output;
an acoustic transducer electronically connected to the output of said signal source and mounted on said waveguide film at a second position proximate said first position;
said acoustic transducer propagating an acoustical wave at a selected frequency, determined by said signal source, on the surface of said waveguide film along said preferred direction to convert the mode of said light beam to a second waveguide mode having a different number of points where the electric field is zero than does said first waveguide mode of said light beam, when the selected frequency and phase of said acoustical wave matches the frequency and phase of said light beam;
a metallic plate mounted on said waveguide film at a third position along said preferred direction proximate said acoustic transducer for selectively blocking said first waveguide mode component of said light beam and passing said second waveguide mode component.

2. A electronically tunable optical filter according to claim 1 wherein said input light source is an optical grating in said waveguide in the path of a light beam for coupling said light beam into said waveguide.

3. An electronically tunable optical filter according to claim 1 wherein said acoustic transducer is an interdigital transducer.

4. An electronically tunable optical filler according to claim 1 including a metallic layer mounted between said optical waveguide and said substrate and wherein said acoustic transducer is mounted on said substrate.

* * * * *